Dec. 26, 1950          J. P. MILLS          2,535,648
AUTOMATIC FEED MECHANISM
Filed Oct. 4, 1946          2 Sheets—Sheet 1

INVENTOR:
John Penrose Mills
BY Carr Carr McGaughy,
His ATTORNEYS.

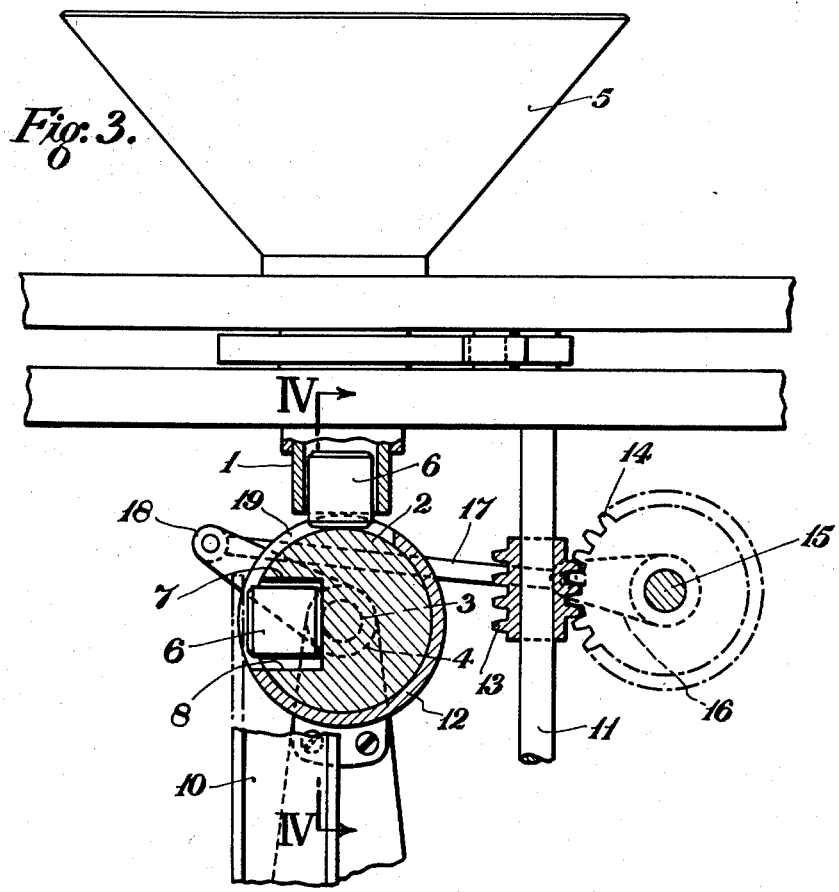
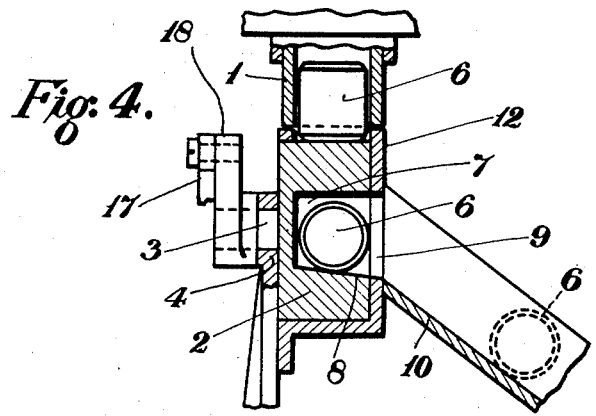

Patented Dec. 26, 1950

2,535,648

UNITED STATES PATENT OFFICE 2,535,648

AUTOMATIC FEED MECHANISM

John Penrose Mills, Wolverhampton, England, assignor to The Timken Roller Bearing Company, Canton, Ohio, a corporation of Ohio Application October 4, 1946, Serial No. 701,232
In Great Britain October 31, 1945

3 Claims. (Cl. 193—43)

This invention relates to automatic feed mechanism for feeding cylindrical articles, such as rollers, one at a time from a hopper or chute to any desired point on a machine in which they are to be treated or operated upon; the said automatic feed mechanism being of the kind comprising a drum device, having a radial recess into which an article falls from a hopper or chute, and being turned angularly to a position in which the article is discharged from the recess.

The object of the present invention is to provide an improved and simplified feed mechanism of the above kind which will enable a cylindrical article to roll to the desired point of operation in a machine.

According to the invention, an automatic feed mechanism for feeding cylindrical articles one at a time comprises an oscillating drum having in its periphery a radial recess in which the article is received in an endwise vertical position, said recess being open at one side of the drum; in combination with means for oscillating the drum in order intermittently to take the recess into a position in which the article will roll out of the recess through the open side thereof. The said articles may be discharged on to a sloping delivery chute or surface down which they may roll to any desired point. The one side wall of the recess may be at such an angle to the axis of the drum that when the drum is moved into the discharge position, said side wall slopes downwardly towards the lateral opening of the recess, so that the article can roll down it out of the recess.

Figure 1 of the accompanying drawings is a vertical section through the oscillating drum of a feed device in accordance with the present invention, the same being shown in its initial position as when receiving an article from a hopper.

Figure 3 is a view similar to Figure 1 but with the drum shown oscillated to its other extreme position for delivery of an article.

Figure 4 is a cross-section on line IV—IV, Figure 3.

Figure 1:
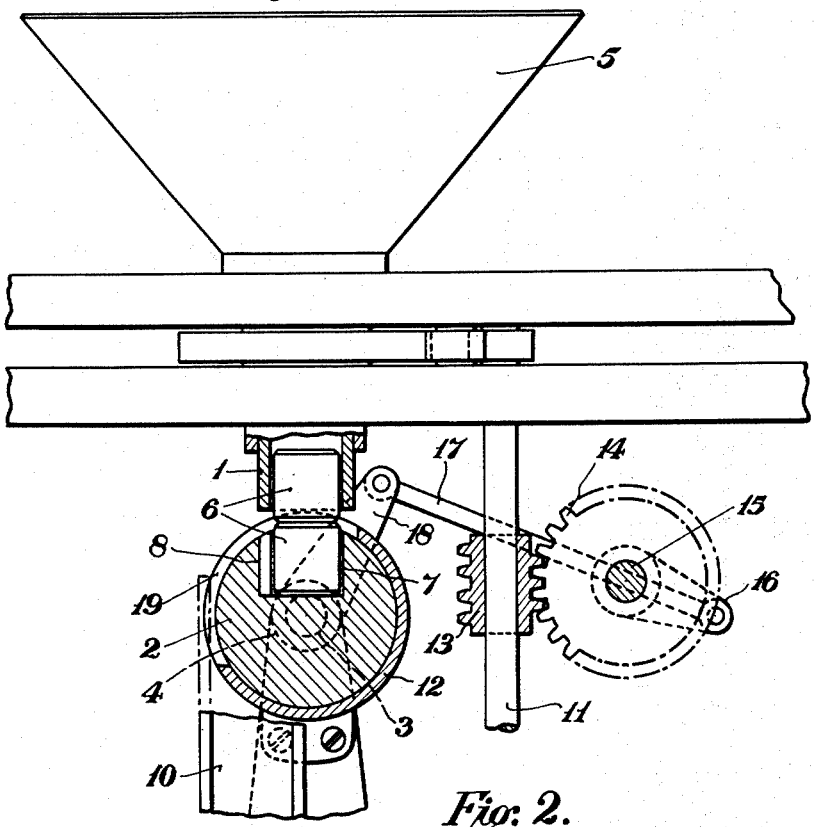
Figure 2:
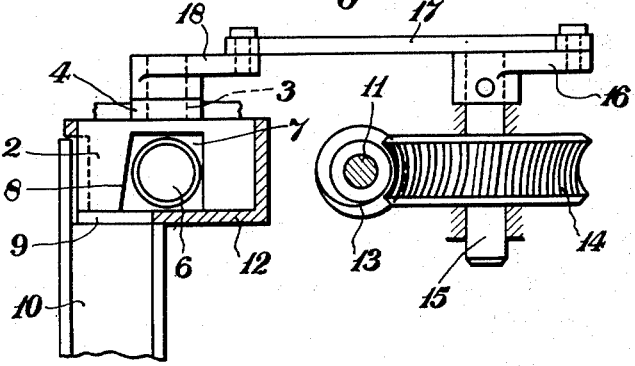
Figure 2 is a plan view of the drum and its operating mechanism, with the casing of the drum in section.

Referring to the said drawings, which show a convenient embodiment of the invention in connection with the feeding of cylindrical rollers or workpieces from a supply chute 1 to any desired point in a machine where they are to be operated upon, the mechanism comprises a cylindrical drum 2 rotatably mounted within a casing 12 by means of a spindle 3 supported in a bearing 4. The drum is adapted to turn about a horizontal axis and is located beneath the vertical delivery chute 1 of a hopper 5 through which the rollers 6 are delivered in succession in vertical axial alignment. In the periphery of the drum is a single radial recess 7 of a depth substantially equal to or somewhat less than the length of a roller 6 and being adapted, when in a vertical position beneath the hopper chute, as in Figure 1, to receive a roller therefrom, the roller thus taking a radial position in the recess with its axis vertical.

The recess 7 is open laterally at one side of the drum, and any known or suitable means are provided for oscillating the drum through 90°, from a position in which the radial recess is vertical (Figure 1) to a position in which it is horizontal (Figures 3 and 4), and back again to a vertical position. The side wall 8 of the recess 7 which is in advance while the recess is being moved to a horizontal position, is flat and is disposed at such an angle to the axis of the drum that when the recess is in the said horizontal position (Figure 4), this wall 8 slopes gently outwards and downwards towards the lateral opening of the recess. In this position of the drum, the recess 7 is opposite to an opening 9 in the casing 12, and adjacent said opening a downwardly sloping delivery chute 10 is fixed to the casing.

Conveniently, the drum 2 may be oscillated from the machine to which the rollers are to be delivered by means of a vertical shaft 11 carrying a worm 13 meshing with a worm-wheel 14 on a horizontal shaft 15 upon which is mounted a crank 16 coupled by a connecting-rod 17 to a crank 19 on the drum spindle or axle 3. The two cranks 16, 18, may be disposed substantially or nearly at right-angles to one another, and the dwell of the crank 16 on the worm-wheel shaft 15, as it moves through the dead-centre positions, is preferably arranged to coincide with the charge and discharge positions of the drum shown in Figures 1 and 3 respectively, thereby temporarily arresting the drum in those positions. Thus the rollers are allowed to enter and be discharged from the drum recess without jamming.

In operation, each time during the oscillation of the drum 2 that the radial recess 7 comes into a vertical position beneath the hopper chute 1, the lowest roller from the chute drops endwise into it, as in Figure 1, its upper end coming substantially flush with or slightly above the periphery of the drum, so that a second roller cannot enter the recess. As the drum oscillates to take the recess 7 into a horizontal position (Figures 3 and 4), the roller 6 in said recess moves from under the chute whilst the next lowest roller in said chute rests upon the plain periphery of the drum, as in Figure 3. When the recess 7 reaches the horizontal position, at the end of the forward oscillatory movement, the sloping wall 8 of the recess is beneath the roller (see Figure 4) and the latter can then roll down it and through the side opening of the recess clear of the drum. The drum then returns to its initial position in order again to take the radial recess beneath the hopper chute, when the next lowest roller drops vertically into it, the operation being repeated, so that the rollers are discharged from the drum in succession.

As each roller rolls out of the recess 7 in the drum, it passes through the opening 9 in the casing 12 and falls on to the sloping delivery chute 10 down which it rolls to the desired point in the machine where it is to be operated upon. As shown, the periphery of the casing 12 may be slotted at 19 to allow the projecting outer end of the roller to move therein as the drum is oscillated.

I claim:

1. An automatic feed mechanism for feeding cylindrical articles one at a time comprising a casing having a side opening and a top opening, an oscillating drum mounted in said casing on a horizontal axis and having in its periphery a radial recess open to one side face of the drum and in which an article is received through the top opening in an endwise vertical position, in combination with means for oscillating the drum through ninety degrees to cause the recess to move from an initial vertical receiving position opposite to the top opening to a horizontal discharge position opposite to the side opening and back to the initial position; said oscillating means being such that the drum is temporarily arrested in said receiving and discharge positions, and one side wall of the recess being at such an angle to the axis of the drum that when the said drum is in the discharge position it forms the floor of the recess and slopes downwardly towards the lateral opening to allow an article to roll out of the recess through the side opening.

2. An automatic feed mechanism for feeding cylindrical articles one at a time comprising a casing having a side opening, an oscillating drum mounted in said casing on a horizontal axis and having in the upper part of its periphery a radial recess in which an article is received in an endwise vertical position, said recess being open at one side face of the drum and having a sloping wall to provide for article discharge when registered with said casing side opening, and means for oscillating the drum through ninety degrees whereby the recess intermittently takes a position in which an article therein is carried on said sloping wall and will roll out through the casing side opening.

3. An automatic feed mechanism for feeding cylindrical articles one at a time comprising a casing having an opening in the side thereof, an oscillating drum mounted in said casing on a horizontal axis and having in the upper part of its periphery a radial recess open to one side face of the drum and in which an article is received in an endwise vertical position, and means for oscillating the drum in order intermittently to cause the recess to take a substantially horizontal discharge position opposite the side opening in said casing; one side wall of the recess being at such an angle to the axis of the drum that when the drum is in the horizontal discharge position, said side wall constitutes the floor of the recess and slopes downwardly towards the lateral opening, so that an article in the said recess can roll down said wall and out of the recess.

JOHN PENROSE MILLS.

REFERENCES CITED

The following references are of record in the file of this patent:

UNITED STATES PATENTS

| Number | Name | Date |
| --- | --- | --- |
| 1,562,152 | Du Grenier | Nov. 17, 1925 |
| 2,235,084 | Ortegren et al. | Mar. 18, 1941 |